UNITED STATES PATENT OFFICE.

RICHARD W. WAHL, OF CHICAGO, ILLINOIS.

BREAD-IMPROVER AND PROCESS OF MAKING THE SAME.

1,190,827.

Specification of Letters Patent. Patented July 11, 1916.

No Drawing. Application filed January 21, 1916. Serial No. 73,308.

*To all whom it may concern:*

Be it known that I, RICHARD W. WAHL, a citizen of the United States, residing at Chicago, in the county of Cook and State of Illinois, have invented a new and useful Improvement in Bread-Improvers and Processes of Making the Same, of which the following is a specification.

The object of my invention is to provide a new yeast food and bread improver and a process of making the same suitable for use in the manufacture of bread or any other baked goods in which aeration is effected by fermentation with the aid of yeast.
As is well known the aeration is effected by the development of carbonic acid gas, evolved from sugar contained in the flour or added thereto or mixed with the dough in the form of saccharose, glucose or malt extract.

Besides sugar the yeast needs as nourishment mineral substances of the character of phosphates and potassium salts as well as nitrogenous matter in the form of amino bodies or peptones. All of this yeast food is contained in proper proportion in malt extract which, therefore, is believed to constitute the best improver known, as in such improvers, as sugar, the other named food ingredients are absent. Malt extract being very expensive and having other objectionable features such as detracting from the white color of the crumb, and furthermore being productive of a hard crust, it is my object to overcome these disadvantages by employing a yeast food containing all of the necessary constituents, except possibly the requisite amount of sugar. I propose to make this yeast food by the following process: By any of the well-known methods I prepare lactic acid from a mash of malt or bran or any other cereal or like suitable material containing phosphates, potassium salts and nitrogenous matter and fermentable sugar. The lactic acid as it develops will dissolve the phosphates and will also have an activating effect upon the proteolytic enzymes contained in the material, so that a considerable amount or quantity of amino bodies, peptones and other albumen derivatives are formed which serve as food for the development of the lactic acid bacteria in the mash liquor, as well as for the yeast during the dough fermentation. I propose to neutralize the developing lactic acid with such compounds as will serve in turn as a yeast food, such, for instance, as lime, either in the form of burned lime or carbonate of lime, or magnesia, or ammonia, or any combination of these, either in the form of hydrates or carbonates. In thus continuously neutralizing the lactic acid as it is formed with these bases, the growth of the lactic acid bacteria will not be checked as disadvantageously as if the lactic acid were not neutralized, it being known that the growth of the acid-producing bacteria practically ceases when the lactic acid percentage reaches about 2 to $2\frac{1}{2}$ per cent. After the mash is exhausted and no more acid is formed, the liquor is drained therefrom, the grains are then pressed to remove any of the remaining liquor, or the latter is washed out, and this liquor containing lactates of lime, magnesia, and ammonia may be mixed either with the dough or added to the baking water, or the solution of salts may be still further condensed by evaporation or brought to dryness, when the mixture of salts may be added to the flour.

It is particularly to be noted that ammonia in the form of lactate of ammonia affords a nutrient that readily takes the place of amino bodies or peptones.

I prefer to prepare the lactic acid liquor as explained in the patent to Robert Wahl, No. 1,028,508, of June 4, 1912, with the exception that the acidity of the liquor instead of being permitted to develop continuously is constantly checked by the addition of the compounds referred to, and at no time allowed to exceed $\frac{1}{2}$ per cent.

In addition to its use as a bread improver it will be understood that my new product is valuable in all arts in which yeast is employed, as well as in the propagation of the yeast cells themselves in yeast manufacture. Thus, I may make a sour mash as described, neutralizing the acid as it is formed, and I may introduce this mash, containing the lactates and active bacteria, into a yeast propagating mash. There the yeast cells will feed upon the lactates while the bacteria continue to develop, producing acid, which may in turn be neutralized as it is formed, resulting in the direct production of the yeast-nourishing lactates within the mash, and further stimulating the yeast.

It will be understood that while in the foregoing I have referred specifically to certain raw materials for producing my new bread improver, any similar vegetable products, for instance, the aleurone layer of various edible seeds, may also be used for the mash, and it is therefore to be understood that in the claims appended hereto the term "mash" is to be construed as intended to include a mash of any similar vegetable product. Likewise, the term "bread" is to be understood as defining the entire class of yeast-fermented farinaceous food and not restricted to the particular product known specifically by that name.

What I claim as new and desire to secure by Letters Patent is:

1. A concentrated yeast food and bread improver consisting of salts of lactic acid and lactic acid bacteria.

2. A concentrated yeast food and bread improver consisting of mineral salts of lactic acid and lactic acid bacteria.

3. A concentrated yeast food and bread improver consisting of lactate of ammonium and lactic acid bacteria.

4. A concentrated bread improver consisting of salts of lactic acid, lactic acid bacteria and the lactic-acid extracted substances of edible seeds.

5. A bread improver prepared by subjecting a mash to the action of lactic-acid bacteria, and continuously neutralizing the lactic acid as it is formed by the addition of compounds which react therewith to form lactates separating the resultant liquor from the spent material and concentrating said liquor.

6. The process of preparing a bread improver which consists in making a mash containing lactic-acid bacteria, subjecting the said mash to the action of the said bacteria, continuously neutralizing the lactic acid as it is formed by the addition of an ammonia compound, separating the resultant liquor from the spent material and concentrating said liquor.

7. The process of nourishing yeast which consists in introducing into a yeast-propagating mash lactic-acid bacteria and a food upon which they may act to produce lactic acid, and neutralizing the developed lactic acid as it is formed with mineral compounds which react therewith to form lactates, separating the resultant liquor from the spent material and concentrating said liquor.

RICHARD W. WAHL.

In presence of—
  A. C. FISCHER,
  C. C. BRENER.